United States Patent
Thompson

(10) Patent No.: US 6,240,221 B1
(45) Date of Patent: May 29, 2001

(54) INTEGRATED OPTICAL MACH ZEHNDER STRUCTURES

(75) Inventor: George Horace Brook Thompson, Herts (GB)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/280,360

(22) Filed: Mar. 29, 1999

(51) Int. Cl.[7] .................................................. G02B 6/12
(52) U.S. Cl. ..................................... 385/14; 385/4; 385/8
(58) Field of Search ................................. 385/2, 3, 8, 9, 385/14, 37

(56) References Cited

U.S. PATENT DOCUMENTS

| | | | |
|---|---|---|---|
| 4,781,424 | * 11/1988 | Kawachi et al. | 350/96.3 |
| 4,978,188 | * 12/1990 | Kawachi et al. | 350/96.12 |
| 5,881,199 | * 3/1999 | Li | 385/140 |
| 5,956,437 | * 9/1999 | Day et al. | 385/2 |
| 5,970,185 | * 10/1999 | Baker et al. | 385/3 |

FOREIGN PATENT DOCUMENTS

| | | | |
|---|---|---|---|
| 98306084 | 4/1999 | (EP) | 385/14 X |

OTHER PUBLICATIONS

M Kawachi, "Silica waveguides on silicon and their applications to integrated–optic components", Optical and Quantum Electronics, vol. 22, (1990) pp391–416.

* cited by examiner

Primary Examiner—Brian Healy
Assistant Examiner—Omar Rojas
(74) Attorney, Agent, or Firm—Lee, Mann, Smith, McWilliams, Sweeney & Ohlson

(57) ABSTRACT

An integrated optical Mach Zehnder structure has an optical path length modifying heater (phase-shifter) associated with a portion of the length of each interference arm of the Mach Zehnder. The portion of the length of the interference arm associated with one of the heaters is flanked with trenches that provide that portion with a temperature coefficient of birefringence different from that of the corresponding portion of the other interference arm. The invention is applicable no only to stand-alone Mach Zehnders, but also to more complex Mach Zehnder structures having a series combination of two or more component Mach Zehnders that are close coupled by having the two outputs of one component Mach Zehnder of the complex structure constitute the two inputs of the next component Mach Zehnder of the complex structure.

11 Claims, 4 Drawing Sheets

INTEGRATED OPTICAL MACH ZEHNDER STRUCTURES

BACKGROUND TO THE INVENTION

This invention relates to integrated optical Mach Zehnder structures, and in particular to such structures constructed in integrated optical waveguide format. Such a format typically, but not necessarily, comprises a silicon substrate upon which has been grown, in succession, a dielectric layer of buffer material, a waveguide layer of higher refractive index material, and a cladding layer which is not deposited until after the waveguide layer has been patterned and selectively etched to produce a pattern of ribs (cores) of waveguide layer material.

The invention is particularly concerned with the regulation of birefringence in integrated optical waveguide format dynamically controllable Mach Zehnders, and is also concerned with the use of such Mach Zehnders as wavelength selective controllable attenuators. Birefringence is significant in such Mach Zehnders because such birefringence has the effect of making the optical attenuation exhibited by such a structure different for the two principal states of polarisation (principal SOPs).

The integrated optical waveguides that were initially produced using silica on single crystal silicon technology exhibited significant birefringence which has been attributed to the effects of anisotropic strain resulting from thermal expansion coefficient mismatch between that of the material of the waveguide cores and that of the underlying silicon substrate. More recently, it has been possible to produce integrated optical waveguides with much reduced birefringence. One method for producing such low birefringence integrated optical waveguides involves choosing for the material of the cladding layer a material having a thermal expansion coefficient matched with that of the material of the substrate, as is described in the specifications of U.S. patent application Ser. No. 081942189, and its European counterpart, European Patent Application No. 98306084.9.

The use of thermo-optic phase-shifters to adjust the relative optical path length of the two interference arms of an integrated optical waveguide Mach Zehnder is known and is, for instance, described in the invited paper by Masao Kawachi entitled, 'Silica waveguides on silicon and their applications to integrated-optic components', Optical and Quantum Electronics, Vol. 22, (1990) pp391–416. Such a phase-shifter employs a thin-film Joule-effect heating strip on the cladding layer above and in registration with a portion of underlying waveguide core. The thermo-optic constants of the constituent parts of an integrated optical waveguide are such that, when an electric current is passed through a heating strip overlying such a waveguide, the effective refractive index of the underlying waveguide is increased. Hence the optical path length of that waveguide is increased. The heating also has a mechanical effect due to the thermal expansion coefficient mismatch between these constituent parts. This effect is to introduce stress birefringence because the locally heated material is more readily able to expand in the direction extending normal to the plane of the substrate than in any direction lying in the plane of that substrate. The magnitude of this stress-induced birefringence can be reduced by the etching of grooves into the integrated optics structure on either side of the heating strip in the same manner as is described in the above-mentioned paper for reducing the stress-induced birefringence in integrated optics waveguides employed in other types of integrated optics device.

This groove etching method of reducing the value of stress-induced birefringence in a thermo-optic phase-shifter is not susceptible of adjustment after the creation of the phase-shifter. If, for a specific integrated optics Mach Zehnder structure incorporating one or more such phase-shifters, the particular dimensions of the or each phase-shifter are found in practice not to provide adequate suppression of birefringence, there is no obvious way of remedying the situation in respect of that specific structure.

SUMMARY OF THE INVENTION

The present invention is directed to the provision of an integrated optical waveguide format Mach Zehnder with increased flexibility of adjustment affording the possibility of adjustment not only of the differential optical path length of the interference arms, but also of their differential birefringence.

This flexibility is achieved by including a thermo-optic phase-shifter in each interference arm of the Mach Zehnder, and furnishing one of these phase-shifters with a structure that provides it with a temperature coefficient of birefringence different from that of the other.

In this way not only can there be compensation for birefringence effects of thermo-optic phase-shifter components of such Mach Zehnders, but in certain circumstances compensation also for birefringence effects in other components, such as those of the splitter/combiners by which the interference arms of the Mach Zehnder are coupled with its input and output.

Other features and advantages of the invention will be readily apparent from the following description of preferred embodiments of the invention, from the drawings and from the claims.

DETAILED DESCRIPTION OF PREFERRED EMBODIMENTS

Figure 1:
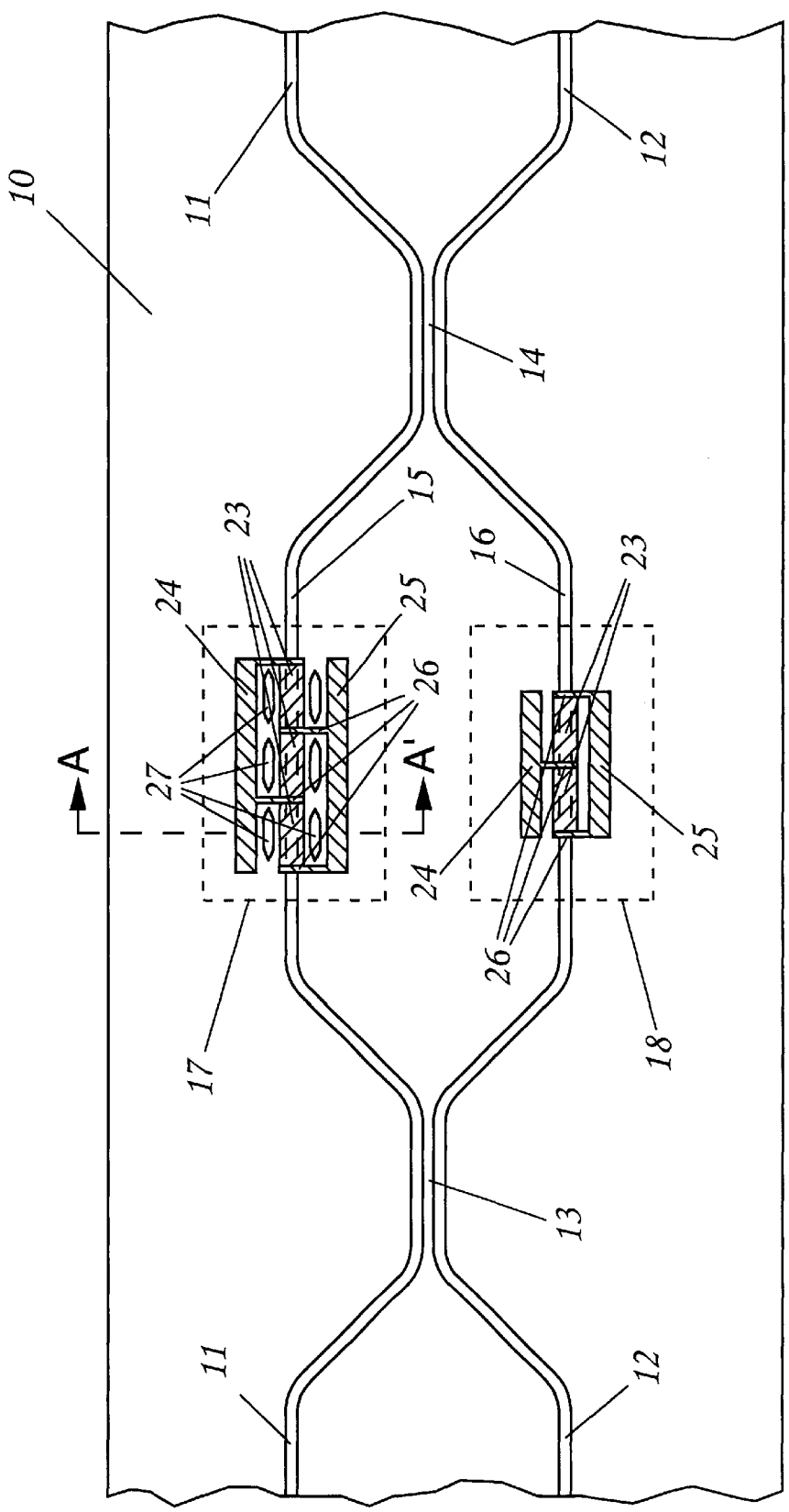
FIG. 1 is a schematic diagram of an optical Mach Zehnder embodying the invention in a preferred form.

Referring to FIG. 1, an integrated optical waveguide structure 10 is provided with a pair of single mode optical waveguides 11 and 12 which have two regions 13 and 14 of close approach where the two waveguides are so close together that the evanescent fields of the zero order guided modes overlap significantly. The length of each of these regions 13 and 14 of close approach is such as to provide a desired level of coupling between the two waveguides 11 and 12 at that region, typically 3 dB coupling. In this way an integrated optics Mach Zehnder waveguide configuration is provided, in which the portions 15 and 16 of waveguides 11 and 12 that extend between the two couplers 13 and 14 constitute the two interference arms of the Mach Zehnder.

Figure 2:
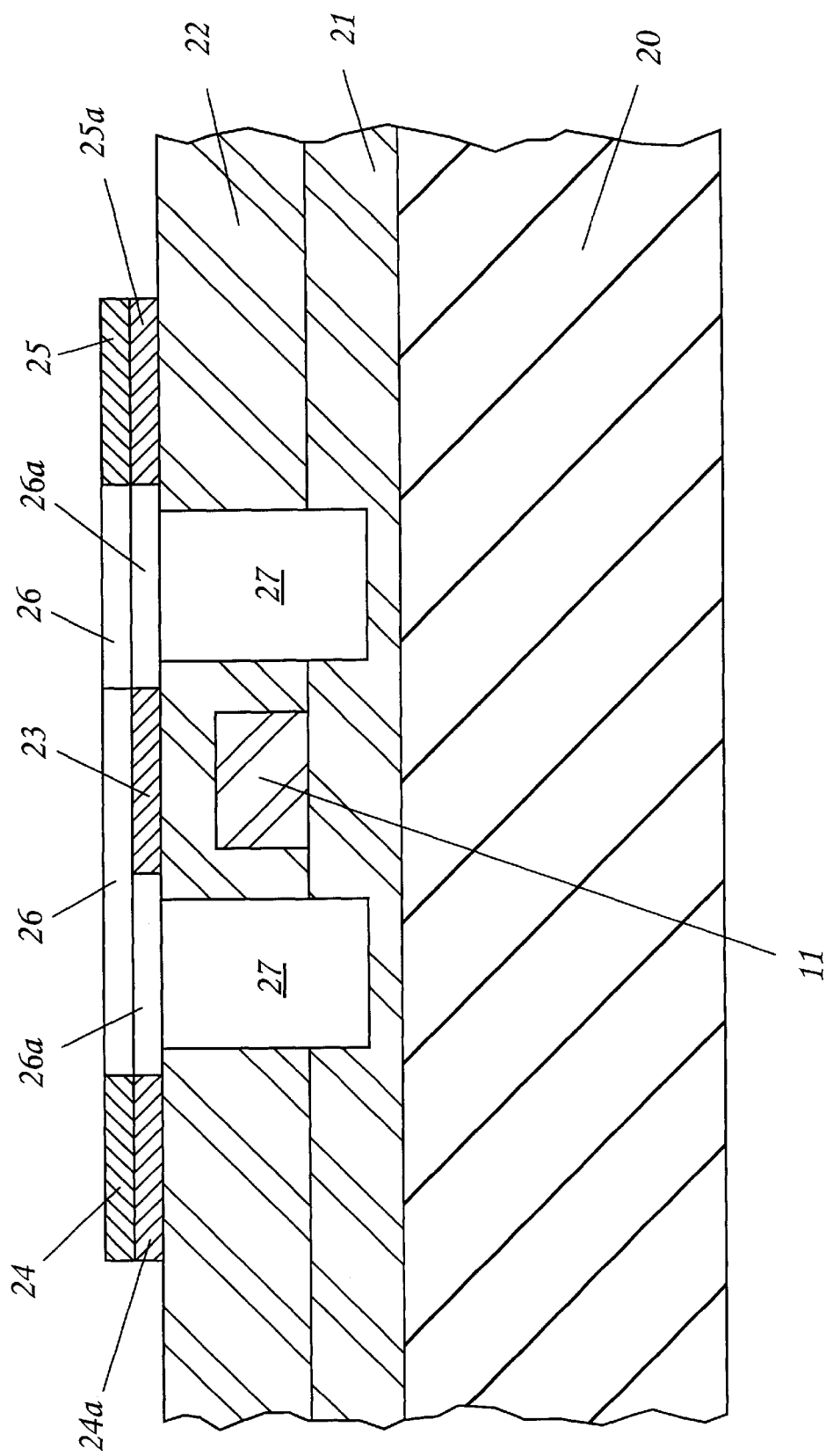
FIG. 2 depicts a schematic cross-section through a phase-shifter 17 of the Mach Zehnder of FIG. 1 on the line A A'.

Into these two interference arms are inserted two thermo-optic phase-shifters 17 and 18. An understanding of the construction of the phase-shifters 17 and 18 is facilitated by reference to FIG. 2 in conjunction with FIG. 1, FIG. 2 schematically depicting a cross-section through phase-shifter 17 on the line AA'. The substructure of the integrated optics waveguide structure 10 was built upon a silicon substrate 20. On this substrate was formed a silica buffer layer 21. On the buffer layer was deposited a layer of core glass, which was subsequently patterned and selectively etched to leave the waveguide cores 11 and 12 (core 12 not shown in FIG. 2). These cores were covered with a layer 22 of cladding glass.

The buffer and cladding glass layers 21 and 22 have matching refractive indices, a value that is less than that of the core glass of the waveguide cores 11 and 12. The relative glass transition temperatures of the buffer, core glass and cladding glass layers are chosen to keep the distortion of the cores, consequent upon deposition of the cladding glass, within acceptable bounds. The thermal expansion coefficient of the cladding glass is preferably matched with that of the silicon substrate. Though the buffer layer has previously been identified as being made of silica, this is not necessarily undoped silica.

In a particular example employing a silica coated silicon substrate, the waveguides 11 and 12 had a 5 $\mu$m wide by 6 $\mu$m high rectangular cross-section, and the cladding glass layer 22 provided an overcladding 12 $\mu$m thick. The two waveguides were separated by approximately 4 $\mu$m in the coupling regions 13 and 14 of close approach. The core/cladding refractive index difference was 0.011, and the minimum bend radius of the curved portions of the waveguides was 5 mm.

In order to form a thermo-optic phase-shifter, a layer of electrically resistive material, such as chromium, is deposited upon the cladding glass, is patterned and etched to leave a heating strip 23 together with areas 24a, 25a and 26a to which contact pads 24 and 25, and low resistance links 26 between the heater strip and those contact pads may be respectively bonded. The pads 24 and 25, and their links 26 are formed in a subsequently deposited, patterned and etched layer of contact metal, such as gold.

A series of troughs 27 that penetrate right through the cladding glass layer 22, and well into the underlying buffer layer 21, are etched between the heating strip 23 and the contact pads 24 and 25. These troughs 27 are to be found only in thermo-electric phase-shifter 17, and have no counterpart in phase-shifter 18.

When the phase-shifter 18 is energised to raise the temperature of that portion of the core 12 underlying its heating strip 23 by a predetermined amount above its surroundings, the effect of the thermal expansion coefficient mismatch of that core glass is to subject the core to anisotropic stress because the geometry of its environment is such that the core is more constrained against lateral expansion in the plane of the cladding glass layer 22 than it is constrained against expansion in the direction normal to that layer. This anisotropic stress produces birefringence. In the case of a corresponding energisation of the heating strip 23 of phase-shifter 17 to produce an equivalent temperature rise, the anisotropic stress is not so great because the core is, by virtue of the etched wells 27, less constrained against lateral expansion. Accordingly, for any given temperature rise, the induced value of birefringence per unit length is less in phase-shifter 17 than in phase-shifter 18.

Under the assumption that the other components of the Mach Zehnder of FIGS. 1 and 2 exhibit insignificant birefringence in comparison with that of the two phase-shifters 17 and 18, the way in which these two phase-shifters may be operated to make the Mach Zehnder with 3 dB couplers 13 and 14 split optical power applied to one of its waveguides in the same ratio for both principal states of polarisation (PSOPs) will now be explained.

Consider the instance in which phase-shifter 17 of waveguide 11 has an effective length of $d_1$ over which the temperature is raised by $t_1$, and that phase-shifter 18 of waveguide 12 has an effective length of $d_2$ over which the temperature is raised by $t_2$. It is then assumed that, in respect of the PSOP normal to the plane containing the waveguides, the optical path length increment, $l_{1\perp}$, produced by phase-shifter 17 is $$l_{1\perp} = k d_1 t_1 \qquad (1)$$

where k is a constant of proportionality. The corresponding optical path length increment, $l_{2\perp}$, produced by phase-shifter 18 will be $$l_{2\perp} = k d_2 t_2 \qquad (2)$$

In respect of the PSOP lying in the plane of the waveguide, the corresponding optical path length increment, $l_{1\parallel}$, produced by phase-shifter 17 is $$l_{1\parallel} = (k+k') d_1 t_1 \qquad (3)$$

where k' is a constant that characterises the birefringence per unit length, per unit temperature rise of phase-shifter 17, and has a smaller modulus than k.

The corresponding optical path length increment, $l_{2\parallel}$, produced by phase-shifter 18 is $$l_{2\parallel} = (k+mk') d_2 t_2 \qquad (4)$$

where m is a constant describing the factor by which the birefringence per unit length, per unit temperature rise of phase-shifter 18 is greater than that of phase-shifter 17.

For the PSOP normal to the plane of the waveguides, the differential optical path length increment, $\Delta\lambda_\perp$, (the difference between the increment in interference arm 15 and that in interference arm 16) is given by $$\Delta\lambda_\perp = k(d_1 t_1 - d_2 t_2) \qquad (5)$$

For the other PSOP, the differential optical path length increment, $\Delta\lambda_\parallel$, is given by $$\Delta\lambda_\parallel = (k+k') d_1 t - (k+mk') d_2 t_2 = k(d_1 t_1 - d_2 t_2) + k'(d_1 t_1 - m d_2 t_2) \qquad (6)$$

From (5) and (6) it is clear that, when $d_1 t_1 = m d_2 t_2$, the differential path length increments have the same value, $k(d_1 t_1 - d_2 t_2)$, for both PSOPs. In other words, under the condition that $d_1 t_1 = m d_2 t_2$, the phase shifters 17 and 18 may be operated to vary the optical path length difference of the Mach Zehnder without altering the differential birefringence, if any, of those arms. If the phase shifters 17 and 18 are designed so that the application of the same electrical bias to both phase shifters raises the temperature of each by the same amount, and if additionally the relative lengths of those phase shifters satisfy the condition $d_1 = m d_2$, then the phase-shifters can be operated to vary the optical path length difference of the Mach Zehnder, without altering the differential birefringence (if any) of its interference arms, by the use of a single source of electrical bias which is applied in parallel across both phase-shifters. If there is differential birefringence in the interference arms elsewhere than in the phase-shifters then, instead of arranging matters so that the additional birefringence introduced into interference arm 15 by phase-shifter 17 is exactly counterbalanced by the additional birefringence introduced into interference arm 16 by phase-shifter 18, matters can be alternatively arranged to ensure that a non-zero value of differential birefringence is introduced by the two phase-shifters, this value being such as to counterbalance the differential birefringence of the interference arms that is external to the phase-shifters.

One of the uses of the Mach Zehnder of FIGS. 1 and 2 is as a dynamically controllable optical attenuator. The device is essentially a four-port device, and so provides attenuation of light launched into the Mach Zehnder by way of either waveguide 11 or 12 to emerge from the far end of the Mach Zehnder by way of the same waveguide (straight-through attenuation), and also of light launched into the Mach Zehnder by way of either one of waveguides 11 and 12 to emerge from the far end of the Mach Zehnder by way of the other waveguide (cross-over attenuation).

Figure 3:
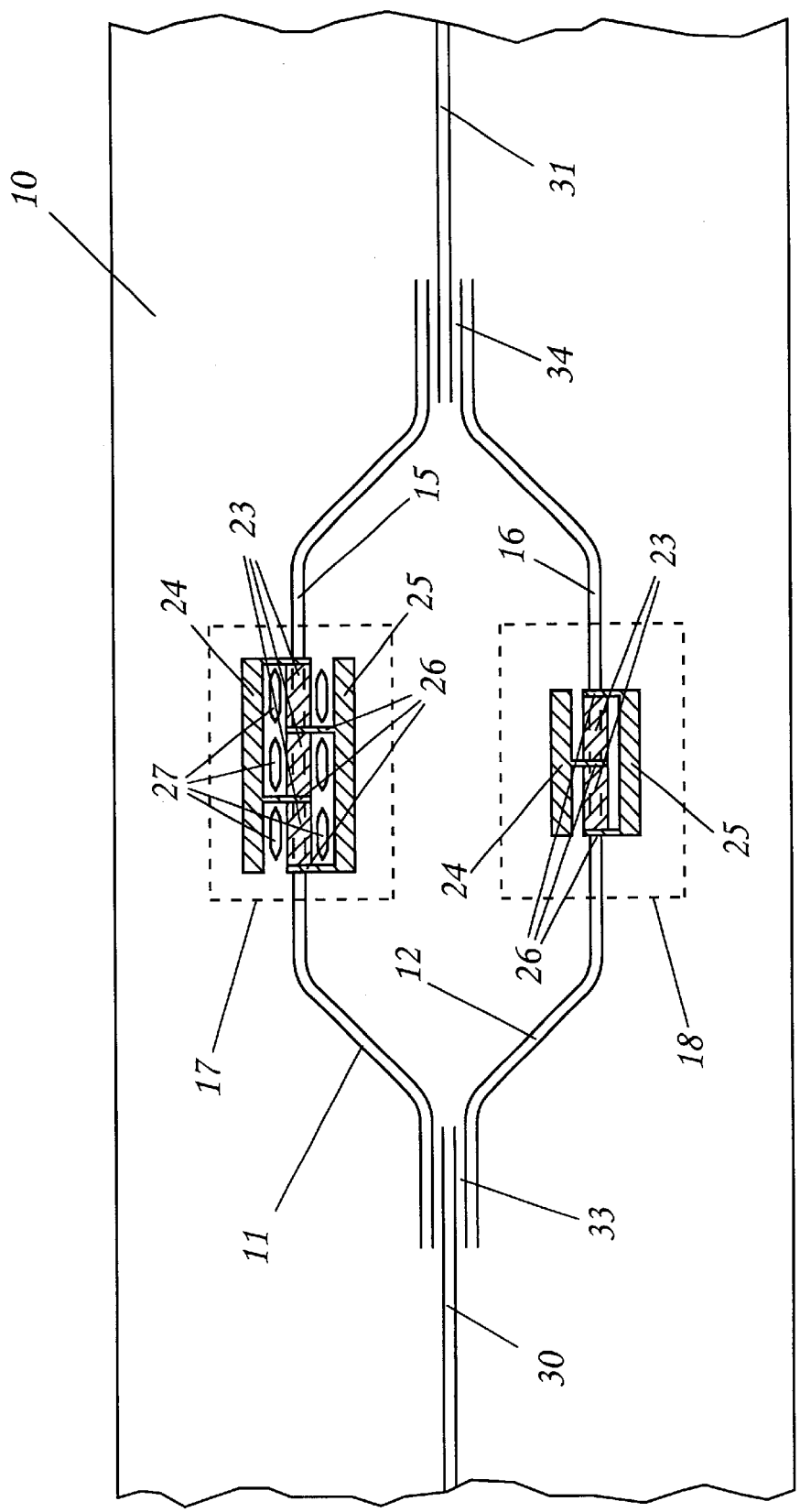
FIG. 3 is a schematic diagram of a variant of the Mach Zehnder of FIG. 1.

In the Mach Zehnder of FIGS. 1 and 2, each of the coupling regions 13 and 14 is provided by a region of close approach of the two waveguides 11 and 12, these close approach regions each thereby forming a four-port directional coupler. Power input on either waveguide is shared by the coupling region between the two waveguides. An alternative way of sharing power between the two waveguides is by the use of a Y-junction or Y-directional coupler. The Mach Zehnder of FIG. 3 is distinguished from that of FIG. 1 solely in that a pair of symmetrical Y-directional couplers 33 and 34, with associated single mode waveguides 30 and 31 have been substituted for the four-port directional couplers 13 and 14. Optical power that is launched into the Mach Zehnder by way of the guided mode of waveguide 30 is divided in equal proportions between the waveguides 11 and 12 by Y-directional coupler 33. The proportion of the power that is coherently launched into Y-directional coupler 34 from waveguides 11 and 12 that is then launched by that Y-directional coupler into the guided mode of its waveguide 31 depends upon the phase relationship between the power propagating in the two waveguides at the point of entry into the Y-directional coupler.

The Mach Zehnder of FIGS. 2 and 3 can also be used as an optical attenuator. In this case the Mach Zehnder has only two ports, and so provides attenuation of light launched into the Mach Zehnder by way of the guided mode of waveguide 30 to emerge from the far end by way of the guided mode of waveguide 31.

When the Mach Zehnder of FIGS. 1 and 2 is used as an optical attenuator the amount of straight-through attenuation varies sinusoidally as the length of one interference arm is increased with respect to that of the other arm. In the absence of any losses within the Mach Zehnder, the theoretical minimum value of straight-through attenuation is zero, while the maximum value depends upon the strength of coupling afforded by the two couplers 13 and 14. In the absence of any losses within the Mach Zehnder, the theoretical maximum value of straight-through attenuation is infinity, and this occurs when the coupling strength is 3 dB. However the utility of the Mach Zehnder of FIGS. 1 and 2 as an optical attenuator is restricted by the fact that its couplers 13 and 14 exhibit a coupling strength that is both polarisation-dependent and wavelength dependent. These dependencies result from the fact that the coupling strength of such a coupler depends upon the extent to which the modal fields of the two waveguides of the coupler overlap in the coupling region, and to the fact that the extent and shape of these modal fields are not only different for the two principal states of polarisation (principal SOPs), but also vary with wavelength.

Figure 4:
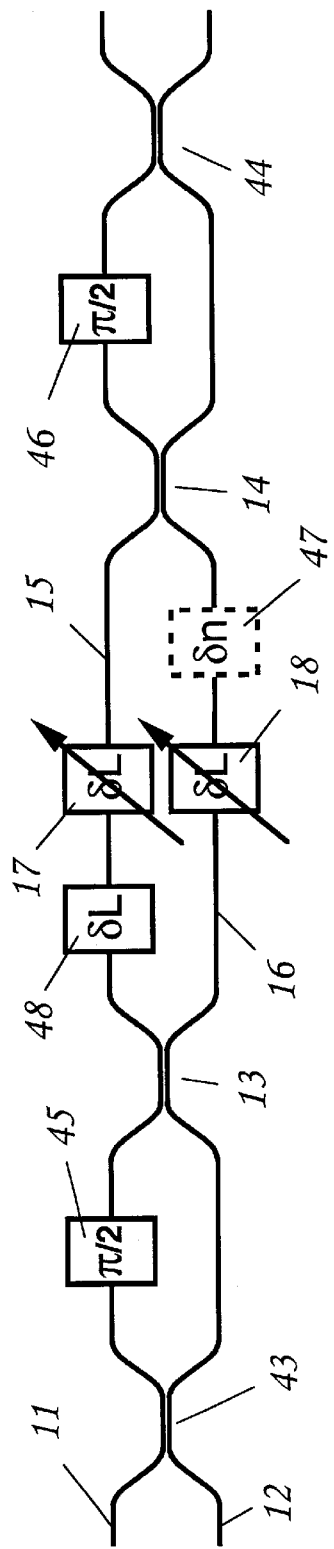
FIG. 4 is a schematic diagram of a triple Mach Zehnder whose central Mach Zehnder is constituted by a Mach Zehnder as depicted in FIG. 1, and FIG. 5 a schematic diagram of a triple Mach Zehnder, each one of whose Mach Zehnders is constituted by a Mach Zehnder as depicted in FIG. 1.

The Mach Zehnders of FIGS. 1, 2 and 3 are stand-alone Mach Zehnders, but the invention is applicable also to more complex Mach Zehnder structures having a series combination of two or more component Mach Zehnders that are close coupled by having the second directional coupler of one component Mach Zehnder of the complex structure constitute the first directional coupler of the next component Mach Zehnder of the complex structure. A complex Mach Zehnder of particular interest is the triple Mach Zehnder in which the three component Mach Zehnders of the structure comprise a central Mach Zehnder sandwiched between two matched end Mach Zehnders having interference arms with matching optical path differences of a value that is in general different from that of the central Mach Zehnder. One form of such a triple Mach Zehnder is depicted in FIG. 4. This triple Mach Zehnder is capable of having features incorporated into it to reduce both its polarisation-dependence and its wavelength-dependence as compared with the corresponding dependencies of the single stand-alone Mach Zehnder of FIGS. 1 and 2.

The central Mach Zehnder of the triple Mach Zehnder of FIG. 4 has all the components of the stand-alone Mach Zehnder of FIGS. 1 and 2, and these components have been assigned the same index numerals in FIG. 4 as in FIG. 2. To these components are added two further coupling regions 43 and 44 similar to coupling regions 13 and 14. Coupling regions 43 and 44 respectively form the outer coupling regions of the end Mach Zehnders of the triple Mach Zehnder. (The coupling regions 13 and 14 correspondingly form the inner coupling regions of the two end Mach Zehnders while at the same time functioning as the end coupling regions of the central Mach Zehnder.) The portions of the two waveguides 11 and 12 extending between coupling regions 13 and 43, and between coupling regions 14 and 44, constitute the interference arms of these two end Mach Zehnders, and in each instance the two interference arms differ in optical path length by an amount that corresponds at least approximately to a phase shift of $\pi/2$ for a particular wavelength of interest, $\lambda_0$, this phase shift feature being indicated respectively at 45 and 46. This particular wavelength of interest, $\lambda_0$, is typically the centre wavelength of a spectral spread of wavelengths for which the attenuator has been designed to operate.

Provision is made for the two interference arms of the central Mach Zehnder to incorporate a fixed amount of differential birefringence to compensate for polarisation-dependent effects in the four coupling regions 13, 14, 43 and 44 of the triple Mach Zehnder. Provision is also made for these two interference arms to incorporate a fixed amount of differential optical path length to compensate for wavelength-dependent effects in the four coupling regions. The provision of the fixed amount of differential birefringence is represented by a fixed birefringence element 47, while the provision of the fixed amount of differential optical path length is represented by an incremental fixed length element 48. The fixed birefringence element 47 is represented in broken outline because, though its function can be provided by a discrete element, it is typically more convenient to incorporate its function into the operation of the phase shifters 17 and 18. The incremental fixed length element 48 is represented in full outline because, though its function can be incorporated into the operation of the phase shifters 17 and 18, it is typically more convenient to provide it as a discrete element.

In order to understand how birefringence element 47 can be employed to compensate for polarisation dependent effects in the couplers 13, 14, 43 and 44 of the Mach Zehnder of FIG. 4, attention will be directed in the first instance back to the stand-alone Mach Zehnder of FIGS. 1 and 2.

The value of attenuation provided by such a stand-alone Mach Zehnder is dependent not only upon the difference in optical path length of its two interference arms, but also upon the coupling strength presented by its component couplers. Therefore the attenuation provided by such a Mach Zehnder is generally polarisation dependent by virtue of the fact that the coupling strength of its component couplers is polarisation dependent though, under certain specific conditions, the attenuation is the same for both principal SOPs of its component couplers.

Consider now the special case of a stand-alone Mach Zehnder in which the two interference arms have an optical path length difference corresponding to a phase difference of $\pi/2$. Simple mathematical analysis shows that, if the coupling strength provided by the couplers 13 and 14 is 3 dB, then the Mach Zehnder operates to divide power launched into one of its input ports equally between its two output ports. To this extent it is operating like a single 3 dB coupler. Further analysis reveals that if the coupling strength of the couplers differs from 3 dB by a small amount, then the division of power between the two output ports differs from equality by an amount significantly less than the corresponding division of power by a single coupler having the same coupling strength and acting as a stand-alone element.

In other words, in a power splitter, the division of power between the two output ports of a stand-alone Mach Zehnder with a $\pi/2$ phase difference in its interference arms is less sensitive to small departures from 3 dB in the coupling strength of its couplers than is a single one of its couplers existing as a stand-alone element. This reduction in power sharing sensitivity is, however, realised at the expense of the introduction of a sensitivity of the phase relationship between the signals in the two output ports of the stand-alone Mach Zehnder to changes in the coupling strength exhibited by its two couplers. When these couplers have 3 dB coupling strengths, the signals in the two output ports are in phase quadrature, just as the signals in the two output ports of a single stand-alone 3 dB coupler are in phase quadrature. However, in the case of the stand-alone Mach Zehnder, this phase relationship changes as the coupling strength of the two couplers departs from 3 dB.

Reverting attention now to the triple Mach Zehnder of FIG. 4, its couplers 13, 14, 43 and 44 will exhibit a coupling strength of 3 dB for light of one of their principal SOPs and a particular wavelength. The outputs from the input and Mach Zehnder will therefore be in phase quadrature for light of this wavelength and SOP. Accordingly, if the interference arms of the central Mach Zehnder are of identical optical path length, the inputs to the output end Mach Zehnder will also be in phase quadrature, and hence the triple Mach Zehnder will operate to provide maximum straight-through attenuation for light of this wavelength and SOP.

Now consider the passage through this triple Mach Zehnder of light of the same wavelength, but the other principal SOP. The coupling strength of the couplers 13, 14, 43 and 44 is not 3 dB, and so the outputs of the input end Mach Zehnder are not in phase quadrature, but have a phase difference of $(\pi/2+\theta)$. If the interference arms of the central Mach Zehnder are still of identical optical path length, the inputs to the output end Mach Zehnder will also not be in phase quadrature, but will have a phase difference of $(\pi/2+\theta)$. However the phase relationship that is required for the output end Mach Zehnder to operate to maximise the straight-through attenuation presented by the triple Mach Zehnder is not $(\pi/2+\theta)$, but is $(\pi/2-\theta)$. In other words, in order to maximise straight-through attenuation at this wavelength, the interference arms of the central Mach Zehnder of the triple Mach Zehnder should have a difference in optical path length providing a zero phase difference for one principal SOP, and a $2\theta$ phase difference for the other SOP. This is provided by the birefringence of birefringence element 47. As previously stated, though this birefringence could be provided by an element separate and distinct from the phase adjusters 17 and 18, it will generally be preferred to provide such birefringence as part of the birefringence provided by those phase adjusters 17 and 18.

In order to understand how the incremental fixed length element 48 can be employed to compensate for wavelength dependent effects in the couplers 13, 14, 43 and 44 of the Mach Zehnder of FIG. 4, attention may be directed to considering the effect of changing the wavelength to a value for which the coupling strength of the couplers 13, 14, 43 and 44 in respect of light of the first principal SOP is removed from 3 dB to the value for which the outputs of the input end Mach Zehnder are not in phase quadrature, but have a phase difference of $(\pi/2+\theta)$. It has already been established that, with this phase difference relationship, the condition required for the triple Mach Zehnder to retain the maximised straight-through attenuation state is the requirement that the interference arms of its central Mach Zehnder should have a difference in optical path length providing a $2\theta$ phase difference. This phase difference is provided by the incremental fixed length element 48. The optimised value of the incremental fixed length element 48 depends upon the particular construction of the couplers 13, 14, 43 and 44, and amounts to between three and five wavelengths $\lambda_0$.

Figure 5:
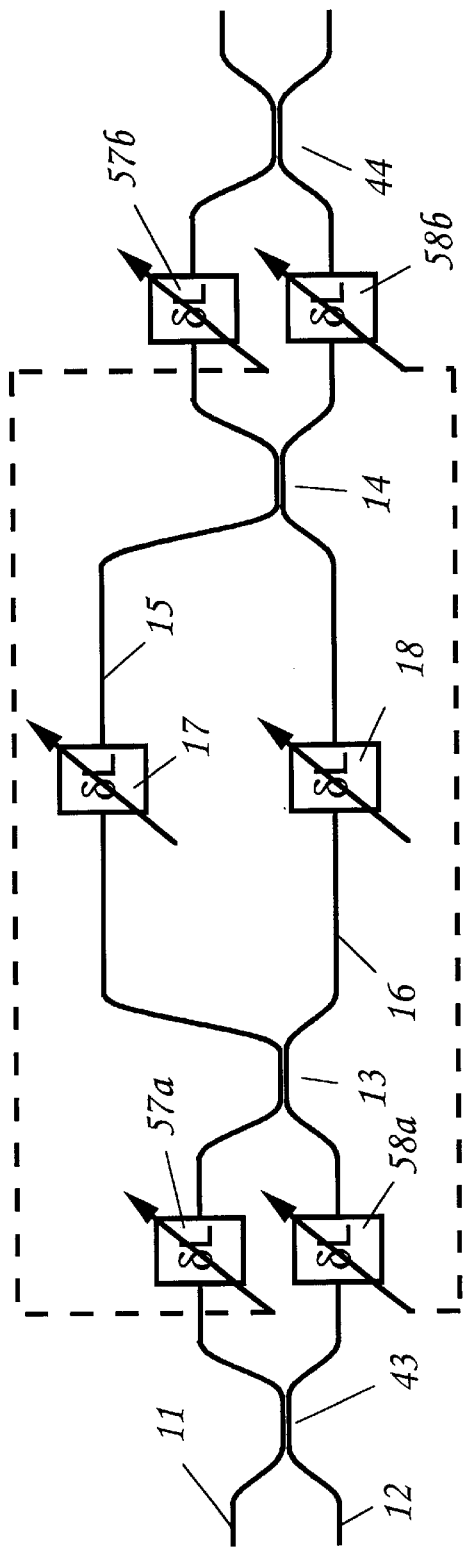

A use for triple Mach Zehnders that is related to their use as substantially neutral density optical attenuators over a particular wavelength range of interest, is use as harmonic optical filters that are dynamically tuneable both in respect of wavelength and optical density. Such use is for instance described by K. Inoue et al. in an article entitled, 'Tunable Gain Equalization Using a Mach-Zehnder Optical Filter in Multistage Fiber Amplifiers', IEEE Photonics Technology Letters, vol. 3, no. 8, pp 718–720. For such use, a facility for phase adjustment is provided in the pair of interference arms of each of the three constituent Mach Zehnders of the triple Mach Zehnder. A triple Mach Zehnder with this facility, and that embodies the present invention in a preferred form, is depicted in FIG. 5. The triple Mach Zehnder of this FIG. 5 differs from its counterpart triple Mach Zehnder of FIG. 4 primarily in that its end Mach Zehnders have variable optical path length interference arms instead of fixed length ones. This variability is given by the provision, in the end Mach Zehnders, of further pairs of phase-shifters 57a, 57b, 58a and 58b similar respectively to phase-shifters 17 and 18 of the central Mach Zehnder. The operation of phase-shifters 57a and 57b is ganged, and so is that of phase-shifters 58a and 58b. This is in order that the end Mach Zehnders remain at all times matched Mach Zehnders. For use as a harmonic filter, the difference (under zero bias conditions of the phase shifters) in optical path length of the interference arms of the centre Mach Zehnder is made large, while the difference in optical path length of the interference arms of the two end Mach Zehnders is made small (typically corresponding to a phase difference of not more than $2\pi$). Alternatively the difference in optical path length of the interference arms of the centre Mach Zehnder is made small, while the difference in optical path length of the interference arms of the two end Mach Zehnders is made large.

Preferably, the end Mach Zehnders and their optical path length modifying heaters are constructed so that their interference arm optical path length differences are variable in the range from $\pi/2$ to $\pi$. In the context of the triple Mach Zehnder of FIG. 4, it has already been shown that, when the interference arm optical path length difference of the end Mach Zehnders has a value corresponding to a phase difference of $\pi/2$, the effects of the polarisation dependence properties of the directional couplers can be compensated by introducing a length increment in one of the interference arms of the central Mach Zehnder. For other values of optical path length difference corresponding to a phase difference $\emptyset$ in the end Mach Zehnders, it can be shown that the required amount of compensation in the central Mach Zehnder varies as $(1+\cos \emptyset)/\sin \emptyset$. Within the range $\pi/2<|\emptyset|<\pi$, this function departs from linearity to a sufficiently small extent to make it possible to achieve an acceptable level of polarisation dependence compensation by incorporating, into the drive applied to the optical path length modifying heaters of the central Mach Zehnder, a length increment that is linearly proportional to the drive that is applied to the optical path length modifying heaters of the end Mach Zehnders.

What is claimed is:

1. An integrated optical waveguide format optical device including at least one Mach Zehnder structure constituted by an optical input optically coupled with an optical output via two optical interference arms constituted respectively by first and second optical waveguides optically in parallel providing optical coupling between first and second optical waveguide splitter/combiners, wherein a first length portion of the first optical waveguide, and a second length portion of the second optical waveguide, are provided respectively with first and second optical path length modifying heaters, and wherein the first length portion is furnished with a structure that provides the first length portion with a temperature coefficient of birefringence different from that of the second length portion.

2. An integrated optical waveguide format optical device as claimed in claim 1, wherein the optical input and the optical output are optically coupled with the two interference arms by respective first and second four-port directional couplers.

3. An integrated optical waveguide format optical device as claimed in claim 1, wherein the optical input and the optical output are optically coupled with the two interference arms by respective first and second four-port directional couplers.

4. An integrated optical waveguide format triple Mach Zehnder comprising a central Mach Zehnder close coupled between a matched pair of Mach Zehnders comprising an input end Mach Zehnder and an output end Mach Zehnder, each of said central and end Mach Zehnders having first and second waveguides that are optically coupled in an input coupling region and an output coupling region and having first and second interference arms constituted respectively by the regions of the first and second waveguides extending between the input and output coupling regions, wherein, to provide the close coupling between the central and end Mach Zehnders, the input coupling region of the central Mach Zehnder also constitutes the output coupling region of the input end Mach Zehnder, and the output coupling region of the central Mach Zehnder also constitutes the input coupling region of the output end Mach Zehnder, wherein, in respect of the central Mach Zehnder, a first length portion of the first interference arm and a second length portion of the second interference arm are provided respectively with first and second optical path length modifying heaters, and wherein the first length portion is furnished with a structure that provides the first length portion with a temperature coefficient of birefringence different from that of the second length portion.

5. An integrated optical waveguide format triple Mach Zehnder as claimed in claim 4, wherein the input end, and the output end, Mach Zehnders each have first and second interference arms of fixed optical path length difference.

6. A method of attenuating in a dynamically adjustable manner an optical signal having a spectral spread about a central wavelength, in which method the signal is transmitted through a triple Mach Zehnder as claimed in claim 5 wherein, in respect of the interference arms of the input end and output end Mach Zehnders, the fixed optical path difference is substantially equal to a value corresponding to a phase difference of $\pi/2$ at the central wavelength.

7. A method as claimed in claim 6, wherein in the absence of the application of any drive to the first and second optical path length modifying heaters, the interference arms of the central Mach Zehnder differ in optical path length by an amount that compensates at least partially wavelength sensitivity of the triple Mach Zehnder that results from wavelength dependent coupling strength effects in its optical waveguide splitter/combiners.

8. A method as claimed in claim 7, wherein the first and second optical path length modifying heaters are differentially driven in a manner providing the interference arms of the central Mach Zehnder with a differential birefringence that compensates at least partially polarisation state sensitivity of the triple Mach Zehnder that results from polarisation state dependent coupling strength effects in its optical waveguide splitter/combiners.

9. An integrated optical waveguide format triple Mach Zehnder as claimed in claim 4 wherein, in respect of each end Mach Zehnder, a first length portion of the first interference arm, and a second length portion of the second interference arm, are provided respectively with first and second optical path length modifying heaters, and wherein the first length portion is furnished with a structure that provides the first length portion with a temperature coefficient of birefringence different from that of the second length portion.

10. An integrated optical waveguide format triple Mach Zehnder as claimed in claim 9 wherein, in respect of each end Mach Zehnder, the first and second interference arms differ in optical path length by an amount corresponding to a phase difference that is adjustable, by means of the optical path length modifying heaters of that end Mach Zehnder, within a range lying between $\pi/2$ and $\pi$.

11. A method of operating an integrated optical waveguide format triple Mach Zehnder as claimed in claim 10 to provide it with an optical filter characteristic having an absorption characteristic of desired centre wavelength and optical density, wherein first and second drives are applied to the optical path length modifying heaters respectively of the central and end Mach Zehnders respectively for controlling the centre frequency and the optical density, and wherein polarisation dependent effects in the end Mach Zehnders are compensated at least in part by adding, to the application of the first drive to the optical path length modifying heaters of the central Mach Zehnder, a third drive that is a linear function of the second drive.

* * * * *